United States Patent
Makino

(10) Patent No.: US 9,759,169 B2
(45) Date of Patent: Sep. 12, 2017

(54) VAPORIZED FUEL PROCESSING APPARATUS

(71) Applicant: AISAN KOGYO KABUSHIKI KAISHA, Obu-shi, Aichi-ken (JP)

(72) Inventor: Katsuhiko Makino, Aichi-ken (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 42 days.

(21) Appl. No.: 14/918,089

(22) Filed: Oct. 20, 2015

(65) Prior Publication Data

US 2016/0123280 A1   May 5, 2016

(30) Foreign Application Priority Data

Oct. 29, 2014   (JP) .................. 2014-220172

(51) Int. Cl.
*F02M 25/08*   (2006.01)
*F02D 41/00*   (2006.01)
(Continued)

(52) U.S. Cl.
CPC ......... *F02M 25/089* (2013.01); *F02D 41/003* (2013.01); *F02D 41/0032* (2013.01); *F02D 41/18* (2013.01); *F02M 25/0836* (2013.01); *F02M 35/10157* (2013.01); *F02M 35/10222* (2013.01); *F02D 41/004* (2013.01); *F02D 2200/0406* (2013.01); *Y02T 10/144* (2013.01)

(58) Field of Classification Search
USPC ......... 123/519, 520, 518, 516, 184.1, 559.1, 123/563, 316
See application file for complete search history.

(56) References Cited

U.S. PATENT DOCUMENTS

| 4,530,210 A | * | 7/1985 | Yamazaki | ............... F02B 33/44 123/520 |
| 4,541,396 A | * | 9/1985 | Sato | ................... F02M 25/0836 123/383 |

(Continued)

FOREIGN PATENT DOCUMENTS

| JP | S61-17466 U | 1/1986 |
| JP | 2002-138910 A | 5/2002 |

(Continued)

*Primary Examiner* — Hieu T Vo
*Assistant Examiner* — Sherman Manley
(74) *Attorney, Agent, or Firm* — Conley Rose, P.C.

(57) ABSTRACT

A vaporized fuel processing apparatus for an engine, which includes an intake passage equipped with a supercharging device and a throttle valve, has an adsorbent canister and a purge passage. The adsorbent canister is adapted to communicate with a fuel tank. The purge passage communicates the adsorbent canister with the intake passage of the engine. The purge passage has in series a purge valve for controlling communication through the purge passage and a purge pump for generating gas flow from the adsorbent canister toward the intake passage. The purge passage includes a sub-passage for communicating the adsorbent canister with the intake passage without passing through the purge pump. The purge passage divides into a first passage connected to the intake passage downstream of the throttle valve and a second passage connected to the intake passage upstream of the supercharging device.

5 Claims, 8 Drawing Sheets

(51) Int. Cl.
  *F02D 41/18* (2006.01)
  *F02M 35/10* (2006.01)

(56) References Cited

U.S. PATENT DOCUMENTS

| | | | | |
|---|---|---|---|---|
| 4,887,578 A * | 12/1989 | Woodcock | B60K 15/03504 | 123/516 |
| 5,005,550 A * | 4/1991 | Bugin, Jr. | F02M 25/089 | 123/520 |
| 5,183,023 A * | 2/1993 | Hanson | F02M 25/089 | 123/519 |
| 5,765,540 A * | 6/1998 | Ishii | F02M 37/20 | 123/198 D |
| 5,906,189 A * | 5/1999 | Mukai | F02M 25/089 | 123/198 D |
| 6,202,632 B1 * | 3/2001 | Geiger | F02M 25/0836 | 123/519 |
| 6,220,229 B1 * | 4/2001 | Kawamura | F02M 25/0809 | 123/520 |
| 6,910,467 B2 * | 6/2005 | Murakami | F02M 25/08 | 123/383 |
| 7,284,541 B1 * | 10/2007 | Uchida | F02M 25/089 | 123/520 |
| 7,316,223 B2 * | 1/2008 | Wakahara | F02M 25/0809 | 123/520 |
| 7,373,930 B1 * | 5/2008 | Hadre | F02M 25/0836 | 123/198 D |
| 7,905,218 B2 * | 3/2011 | Fornara | F02M 25/08 | 123/520 |
| 2002/0035990 A1 | 3/2002 | Yoshida et al. | | |
| 2004/0237946 A1 * | 12/2004 | Murakami | F02M 25/08 | 123/520 |
| 2005/0011498 A1 * | 1/2005 | Yoshiki | F02M 25/08 | 123/520 |
| 2009/0114180 A1 * | 5/2009 | Fornara | F02M 25/08 | 123/184.47 |
| 2010/0218749 A1 * | 9/2010 | Fornara | F02M 25/08 | 123/520 |
| 2011/0132331 A1 * | 6/2011 | Pursifull | F02B 37/127 | 123/478 |
| 2013/0036990 A1 * | 2/2013 | Chishima | F02M 25/089 | 123/3 |
| 2013/0174808 A1 * | 7/2013 | Kudo | F02M 37/0064 | 123/445 |
| 2013/0199504 A1 * | 8/2013 | Takeishi | F02M 25/0809 | 123/520 |
| 2015/0292421 A1 * | 10/2015 | Pursifull | F02D 41/004 | 123/518 |
| 2016/0131090 A1 * | 5/2016 | Makino | F02D 41/004 | 123/519 |
| 2016/0186694 A1 * | 6/2016 | Wakamatsu | F02M 25/08 | 123/519 |
| 2016/0273493 A1 * | 9/2016 | Ono | F02M 25/0836 | |
| 2016/0290285 A1 * | 10/2016 | Dudar | F02M 25/089 | |

FOREIGN PATENT DOCUMENTS

| | | |
|---|---|---|
| JP | 2002-364465 A | 12/2002 |
| JP | 2003-42014 A | 2/2003 |
| JP | 2007-278094 A | 10/2007 |

* cited by examiner

VAPORIZED FUEL PROCESSING APPARATUS

CROSS-REFERENCE TO RELATED APPLICATIONS

This application claims priority to Japanese patent application serial number 2014-220172, filed Oct. 29, 2014, the contents of which are incorporated herein by reference in their entirety for all purposes.

STATEMENT REGARDING FEDERALLY SPONSORED RESEARCH OR DEVELOPMENT

Not applicable.

BACKGROUND

This disclosure relates to a vaporized fuel processing apparatus for an internal combustion engine equipped with a supercharging device. The vaporized fuel processing apparatus has a purge pump for purging fuel vapor trapped in a canister.

Japanese Laid-Open Patent Publication No. 2007-278094 discloses a vaporized fuel processing apparatus for an internal combustion engine equipped with a supercharging device. The vaporized fuel processing apparatus has a purge pump provided on an air introducing passage of a canister for forcibly flowing the air through the air introducing passage of the canister in order to efficiently purge fuel vapor from in the canister.

However, in such apparatus of Japanese Laid-Open Patent Publication No. 2007-278094, a purge operation for the canister needs driving of the purge pump, so that consumption energy is relatively large. So, there has been a need for improved vaporized fuel processing apparatus.

BRIEF SUMMARY

In one aspect of this disclosure, a vaporized fuel processing apparatus for an engine, which includes an intake passage equipped with a supercharging device and a throttle valve, has an adsorbent canister and a purge passage. The adsorbent canister is adapted to communicate with a fuel tank. The purge passage communicates the adsorbent canister with the intake passage of the engine. The purge passage has in series a purge valve for controlling communication through the purge passage and a purge pump for generating gas flow from the adsorbent canister toward the intake passage. The purge passage includes a sub-passage for communicating the adsorbent canister with the intake passage without passing through the purge pump. The purge passage divides into a first passage connected to the intake passage downstream of the throttle valve and a second passage connected to the intake passage upstream of the supercharging device.

According to the aspect of this disclosure, a purge operation can be performed via the sub-passage without driving the purge pump. Thus, an energy consumption of the purge pump can be decreased.

DETAILED DESCRIPTION

Each of the additional features and teachings disclosed above and below may be utilized separately or in conjunction with other features and teachings to provide improved vaporized fuel processing apparatuses. Representative examples, which utilize many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary in the broadest sense, and are instead taught merely to particularly describe representative examples. Moreover, various features of the representative examples and the dependent claims may be combined in ways that are not specifically enumerated in order to provide additional useful embodiments of the present teachings.

Figure 1:
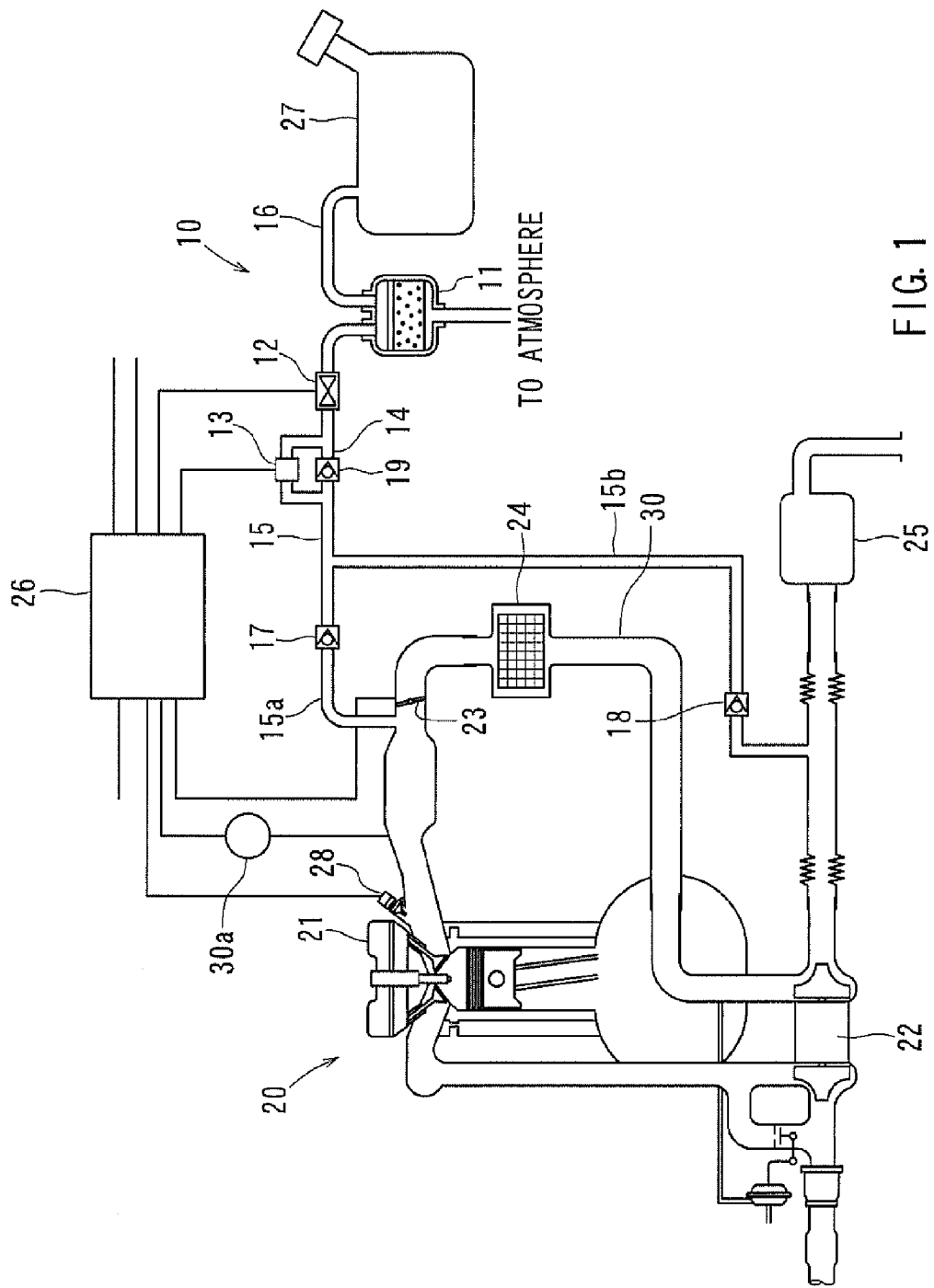
FIG. 1 is a schematic view of a vaporized fuel processing apparatus in a first example.

A first example of this disclosure will be described based on FIGS. 1 to 4. As shown in FIG. 1, a vaporized fuel processing apparatus 10 is added to an engine system 20 for a vehicle, which has a turbocharger 22 as a supercharging device. In a following description, "upstream" and "downstream" are defined based on air flow or gas flow through each area in the engine system 20 and the vaporized fuel processing apparatus 10.

In the engine system 20 shown in FIG. 1, air flowing through an intake passage 30 is mixed with fuel injected from a fuel injection valve 28, and then the mixed gas containing both the air and the fuel is supplied into an internal combustion engine body 21 (also, referred to as "engine" hereinafter). In the intake passage 30, an air cleaner 25, a turbocharger 22, an intercooler 24 and a throttle valve 23 are provided in a sequence from the upstream side toward the downstream side of the air flow. The air flow rate is regulated by the throttle valve 23 so as to control the air supply amount to the engine 21. The fuel flow rate is regulated by the fuel injection valve 28 in order to control the fuel supply amount to the engine 21. The throttle valve 23 and the fuel injection valve 28 are connected to a control unit 26. The throttle valve 23 outputs signals relating to a valve opening amount of the throttle valve 23 to the control unit 26. The control unit 26 regulates valve opening time of the fuel injection valve 28 based on the signals from the throttle valve 23. The fuel injection valve 28 is supplied with fuel from a fuel tank 27 via a fuel supply pipe (not shown). The intake passage 30 is provided with a multifunctional sensor 30a for detecting pressure, flow rate and the like in the intake passage 30 downstream of the throttle valve 23. The multifunctional sensor 30a outputs signals to the control unit 26.

In the vaporized fuel processing apparatus 10, fuel vapor produced during refueling or vaporized in the fuel tank 27 (referred to as "fuel vapor", hereinafter) is introduced into a canister 11 via a vapor passage 16. Because the canister 11 contains therein an adsorbent capable of adsorbing and desorbing the fuel vapor, the canister 11 can trap the fuel vapor so as to prevent the fuel vapor from releasing into the atmosphere. Then, the fuel vapor adsorbed in the canister 11 is purged so as to supply the fuel vapor to the intake passage 30 of the engine 21 via a purge passage 15. The purge passage 15 is provided with a purge valve 12 and a purge pump 13 in sequence from the upstream side toward the downstream side of the fuel vapor flow. The purge passage 15 divides into a first passage 15a and a second passage 15b at a position downstream of the purge pump 13. The first passage 15a is connected to the intake passage 30 (also, referred to as "intake pipe", hereinafter) downstream of the throttle valve 23. The second passage 15b is connected to the intake passage 30 upstream of a compressor of the turbocharger 22. The purge passage 15 includes a bypass passage 14 (also, referred to as "sub-passage") for bypassing the purge pump 13. The first passage 15a, the second passage 15b and the bypass passage 14 are provided with check valves 17, 18 and 19, respectively such that the fuel vapor flows through the purge passage 15 via the check valves 17, 18 and 19 only in a direction from the upstream side toward the downstream side. The purge valve 12 and the purge pump 13 are connected to the control unit 26 and are controlled by the control unit 26. When changing into a condition where the purge operation can be performed depending on an operation state of the engine and the like, the purge valve 12 is opened for allowing gas to flow through the purge passage 15, and the purge pump 13 is operated as described below for forcibly flowing a purge gas containing both the fuel vapor and the air through the purge passage 15. The purge pump 13 is composed of a variable displacement type pump.

Figure 2:
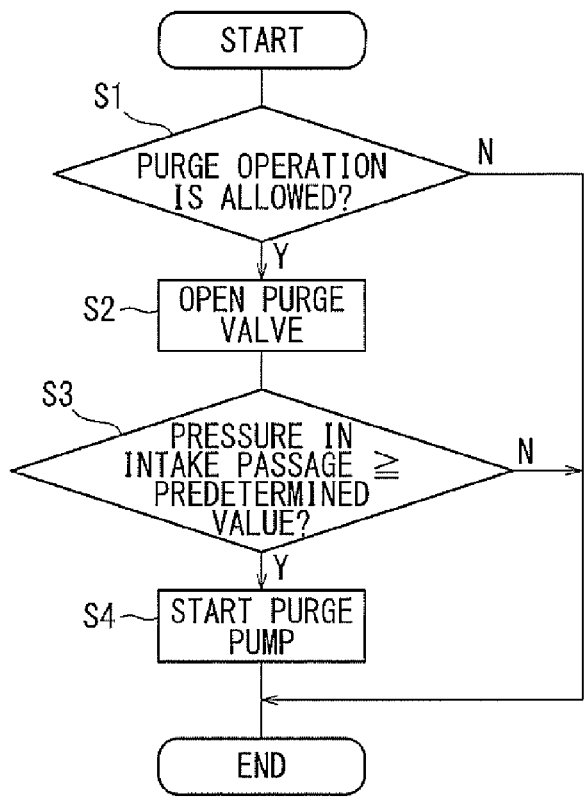
FIG. 2 is a flowchart showing a method for controlling a purge pump.

FIG. 2 shows a procedure for controlling the purge pump 13, which is repeatedly performed by the control unit 26. When starting this procedure, it is determined whether the purge operation is allowed at Step S1 depending on a feedback control for the air-fuel ratio in an air-fuel ratio control procedure for the engine (not shown). When the purge operation is allowed in a condition that the feedback control for the air-fuel ratio is performed, Step S1 is determined as Yes, and then the purge valve 12 is opened at Step S2. When the purge valve 12 is opened, the purge operation via the bypass passage 14 and the first passage 15a can be performed depending on the inner pressure of the intake passage 30 downstream of the throttle valve 23. In detail, in a condition that the inner pressure of the intake passage 30 downstream of the throttle valve 23 is sufficiently low such that the vaporized fuel processing apparatus 10 introduces the ambient air into the canister 11, the canister 11 is purged by the ambient air flowing into the canister 11 and then the mixed gas containing both the air and the purged fuel vapor (referred to as "purge gas," hereinafter) flows through the bypass passage 14 and the first passage 15a to the intake passage 30.

At Step S3, it is determined whether the pressure in the intake passage 30 downstream of the throttle valve 23 is equal to or higher than a predetermined value. When the pressure in the intake passage 30 is equal to or higher than the predetermined value, thereby determining Step S3 as Yes, the purge pump 13 is started at Step S4. In a condition that the pressure in the intake passage 30 is equal to or higher than the predetermined value, the purge operation via the bypass passage 14 and the first passage 15a is minimal. However, after starting the purge pump 13, the purge pump 13 sucks the ambient air via an air introducing port of the canister 11 and forcibly pumps the purge gas into the purge passage 15, so that the fuel vapor trapped in the canister 11 is purged and then is supplied to the intake passage 30 of the engine 21 via the first passage 15a or the second passage 15b. In this operation, the purge gas containing the air and the purged fuel vapor flows through the first passage 15a or the second passage 15b depending on the pressure in the intake passage 30 downstream of the throttle valve 23. When the pressure in the intake passage 30 downstream of the throttle valve increases due to work of the turbocharger 22, the flow rate in the first passage 15a decreases and the flow rate in the second passage 15b increases. When the pressure in the intake passage 30 downstream of the throttle valve 23 increases and the check valve 17 is closed, the flow rate in the first passage 15a becomes zero and all of the purge gas flows through the second passage 15b.

When the purge pump 13 is operated, the check valve 19 is closed for preventing the purge gas pumped from the purge pump 13 from flowing through the bypass passage 14, i.e., flowing from an outlet of the purge pump 13 toward an inlet of the purge pump 13. The check valve 18 prevents the purge gas from flowing through the second passage 15b into the first passage 15a.

When the purge operation is not allowed and Step S1 is determined as No, the purge valve 12 is not opened and the purge operation for the canister 11 is not performed. Further, although Step S1 is determined as Yes, the pressure in the intake passage 30 is lower than the predetermined value and Step S3 is determined as No, thereby resulting the purge operation via the bypass passage 14 and the first passage 15 without driving the purge pump 13.

Figure 3:
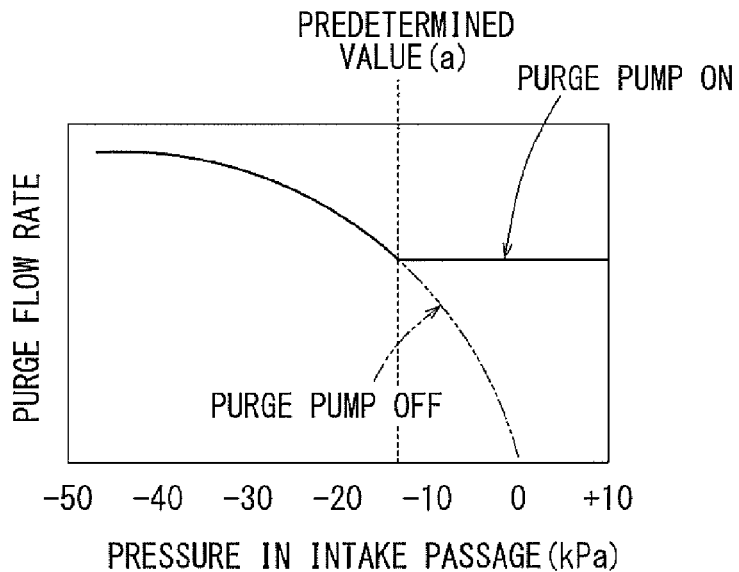
FIG. 3 is a graph showing a relationship between a purge flow rate and a negative pressure in an intake pipe.

FIG. 3 shows changes in the purge flow rate depending on changes in the pressure in the intake passage 30 during the purge operation performed by the first example. In the condition that the purge valve 12 is opened, when the pressure (i.e., absolute pressure) in the intake passage 30 downstream of the throttle valve 23 is lower than the predetermined value (a), that is, negative pressure is large, the purge pump 13 is not driven. Thus, the purge flow rate increases depending on a decrease in the pressure in the intake passage 30, that is, an increase in the negative pressure. In this condition, because the pressure in the intake passage 30 downstream of the throttle valve 23 is negative, the purge gas mainly flows through the first passage 15a and hardly flows through the second passage 15b. If the purge pump 13 is not driven, the purge flow rate would decrease depending on the increase in the pressure in the intake passage 30 downstream of the throttle valve 23 as shown by a two-dot chain line in FIG. 3. However, in this example, because the purge pump 13 is operated in the condition that the pressure in the intake passage 30 downstream of the throttle valve 23 reaches the predetermined value (a), the purge gas flows through the purge passage 15 such that the flow rate of the purge gas is determined based on a capacity of the purge pump 13. During this purge operation with operation of the purge pump 13, the purge gas flows through both the first passage 15a and the second passage 15b or the second passage 15b.

Figure 4:
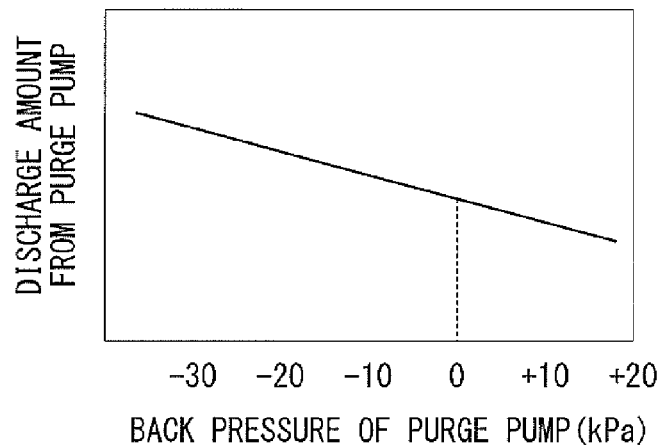
FIG. 4 is a graph showing a relationship between a discharge amount of the purge pump and a back pressure of the purge pump.

FIG. 4 shows changes in the discharge amount from the purge pump 13 depending on changes in the back pressure of the purge pump 13 (corresponding to pressure at the outlet side). As viewed in FIG. 4, the discharge amount from the purge pump 13 decreases depending on an increase in the back pressure. In the first example, even if the second passage 15b is not provided, the back pressure of the purge pump 13 would increase based on an increase in a supercharging pressure by the turbocharger 22, thereby resulting in a decrease in the discharge amount from the purge pump 13. The second passage 15b, however, is provided in the first example as described above. The downstream end of the second passage 15b is connected to the intake passage 30 upstream of the compressor of the turbocharger 22 such that a pressure at the downstream end of the second passage 15 substantially equal to the atmospheric pressure. Thus, when the pressure in the intake passage 30 downstream of the throttle valve 23 exceeds the atmospheric pressure, the back pressure of the purge pump 13 does not exceed the atmospheric pressure in under normal conditions. Accordingly, when the pressure in the intake passage 30 downstream of the throttle valve 23 exceeds the atmospheric pressure, it is able to flow the purge gas containing the fuel vapor from the purge pump 13 through the second passage 15b so as to ensure the discharge amount from the purge pump 13.

According to the first example, the purge operation via the bypass passage 14 can be performed in the condition that the purge pump 13 is not driven. Thus, in the condition that pressure in the intake passage 30 downstream of the throttle valve 23 is lower than the predetermined value, the purge operation can be performed without driving the purge pump 13. Accordingly, energy consumption by the purge pump 13 during the purge operation can be decreased. On the other hand, when the pressure in the intake passage 30 downstream of the throttle valve 23 is higher than the predetermined value such that it is difficult to perform the purge operation via the bypass passage 14, the purge pump 13 is driven so as to perform the purge operation. That is, the purge operation can be appropriately performed depending on the pressure in the intake passage 30 downstream of the throttle valve 23 by selectively using the purge pump 13, the bypass passage 14, the first passage 15a and the second passage 15b.

Figure 5:
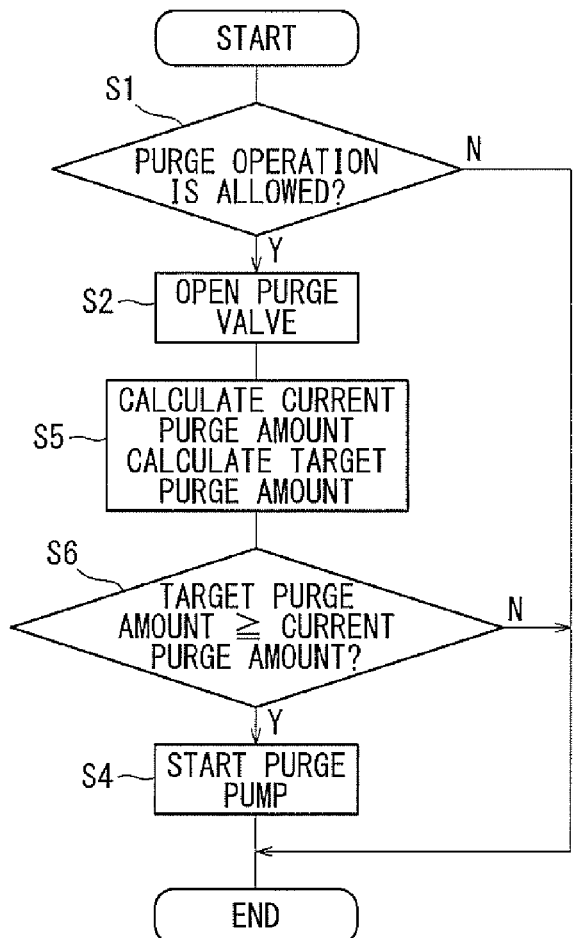
FIG. 5 is a flowchart showing a method for controlling the purge pump in a second example.

Some modified examples of the vaporized fuel processing apparatus 10 will be described below. Because they include various changes with respect to the first example and other configurations same with the first example, the changes will be described and the same configurations will not be described repeatedly. FIG. 5 shows a procedure for controlling the purge pump 13 in a second example. In the second example, it is determined that the purge operation is allowed at Step S1, the purge valve 12 is opened at Step S2, and then a current purge amount and a target purge amount are calculated by the control unit 26 at Step S5. The current purge amount corresponds to the purge flow rate via the bypass passage 14 in the condition that the purge pump 13 is not driven. The current purge amount is calculated based on the both the flow characteristics shown in FIG. 3 and the pressure in the intake passage 30 downstream of the throttle valve 23. On the other hand, the control unit 26 calculates the amount of the fuel vapor adsorbed in the canister based on the running status of the engine 21, the ambient temperature and the like, and then determines the target purge amount based on the calculated amount of the fuel vapor. The control unit 26 compares the target purge amount with the current purge amount at Step S6. When the target purge amount is equal to or larger than the current purge amount, Step S6 is determined as Yes, thereby starting the purge pump 13 at Step S4.

According to the second example, under a condition that the current purge amount is larger than the target purge amount, the purge operation is performed via the bypass passage 14 and the first passage 15a without driving the purge pump 13. When the current purge amount is smaller than the target purge amount, the purge pump 13 is driven, thereby performing the purge operation via the first passage 15a and/or the second passage 15b. In the first example, it is configured to perform the purge operation without driving the purge pump 13 in the condition that the purge operation is performed via the bypass passage 14 depending on the pressure in the intake passage 30 and to drive the purge pump 13 after the purge operation via the bypass passage 14 stops. By contrast, in the second example, the control unit 26 controls the purge pump 13 based on whether the current purge amount is equal to or larger than the target purge amount. Thus, in the second example, when the current purge amount becomes smaller than the target purge amount in the condition that the purge operation is performed via the bypass passage 14, the purge pump 13 is operated. Therefore, the need for working of the purge pump 13 can be examined more accurately, thereby efficiently driving the purge pump 13.

Figure 6:
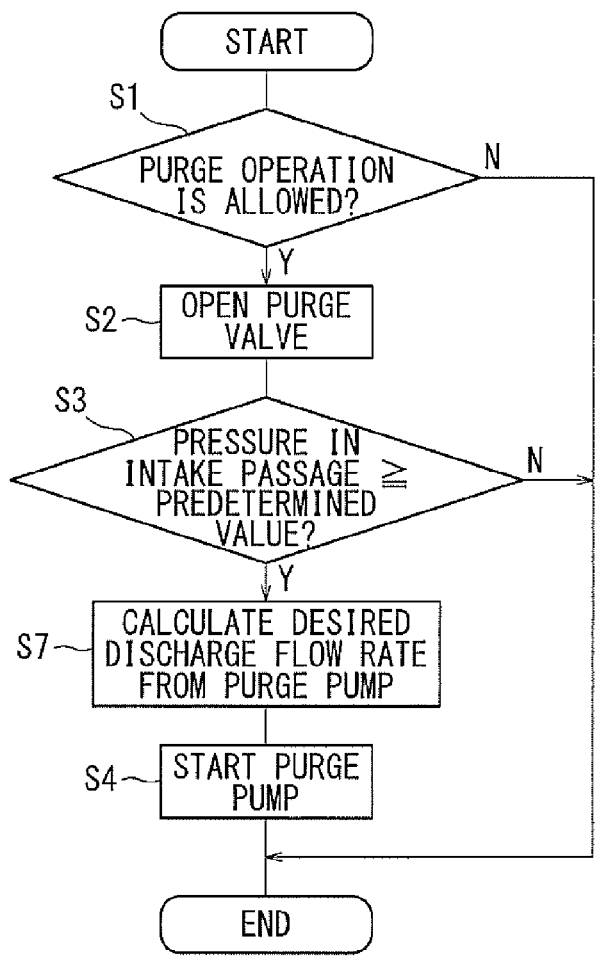
FIG. 6 is a flowchart showing a method for controlling the purge pump in a third example.
Figure 7:
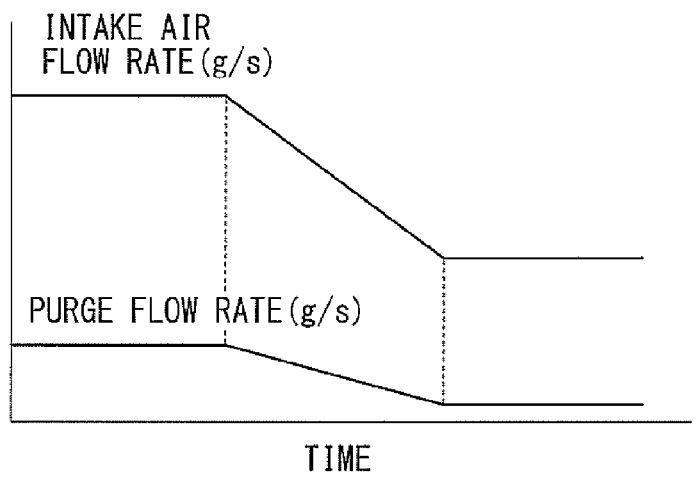
FIG. 7 is a graph showing relationships between time and each of the purge flow rate and an intake air amount.

A third example will be described in reference to FIG. 6. According to the procedure for controlling the purge pump 13 in the third example, it is determined whether the purge operation is allowed at Step S1, the purge valve 12 is opened at Step S2, and then the control unit 26 determines whether the pressure in the intake passage 30 downstream of the throttle valve 23 is equal to or higher than the predetermined value at Step S3. When the pressure in the intake passage 30 downstream of the throttle valve 23 is equal to or higher than the predetermined value, Step S3 is determined as Yes, and then a desired discharge amount from the purge pump 13 is calculated at Step S7. The desired discharge amount from the purge pump 13, which corresponds to the purge flow rate, is determined to be equal to a certain percentage of the intake air flow rate of the engine 21, which is detected by the multifunctional sensor 30a, as viewed in FIG. 7. At Step S4, the purge pump 13 is operated based on the desired discharge amount that has been calculated at Step S7.

According to the third example, the purge pump 13 is controlled such that the discharge flow rate from the purge pump 13 is equal to a certain percentage of the intake air flow rate of the engine 21. Therefore, because the purge flow rate is regulated depending on changes in the intake air flow rate of the engine 21, changes in the air-fuel ratio caused by the purge pump 13 can be decreased.

Figure 8:
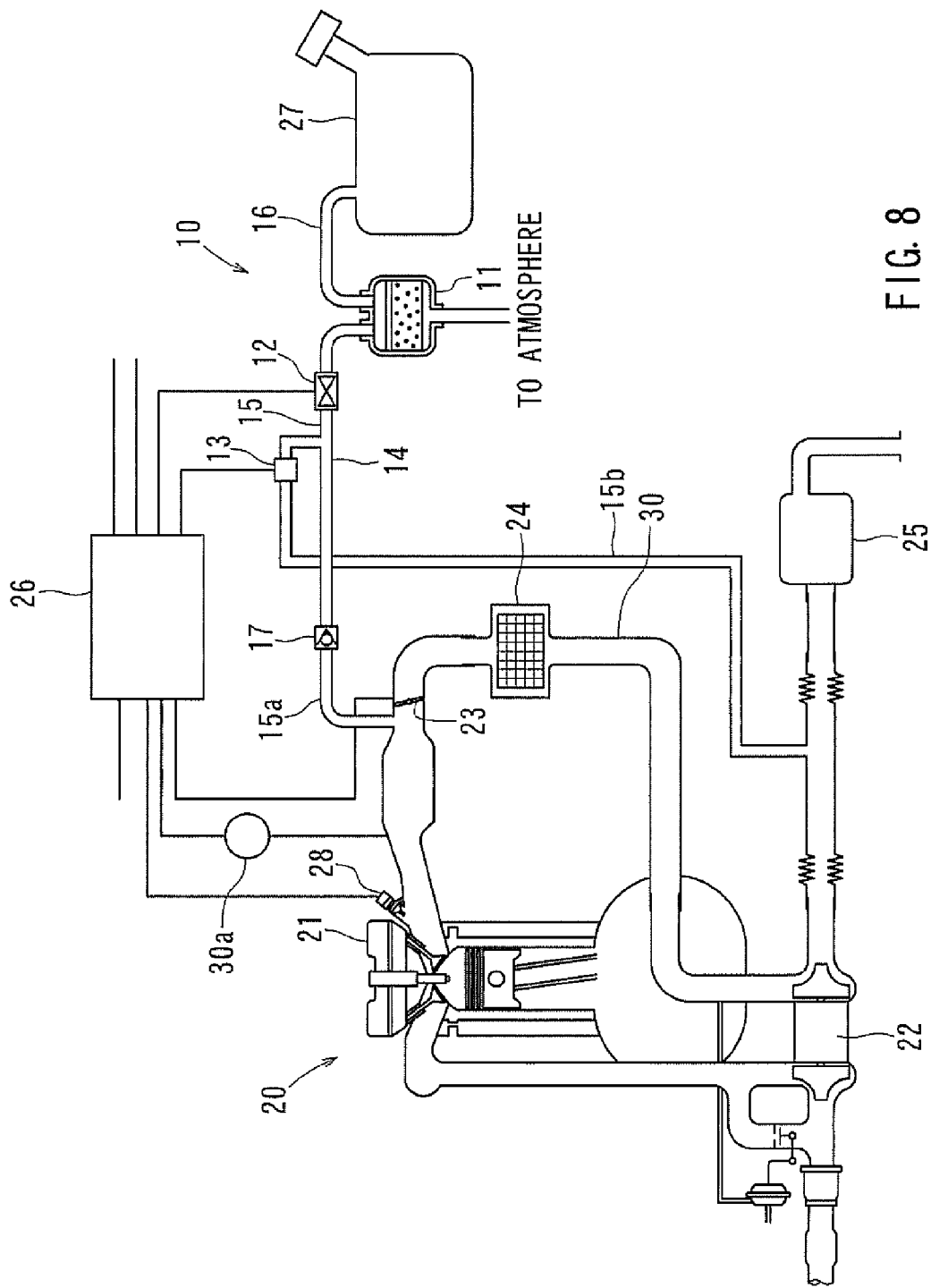
FIG. 8 is a schematic view of the vaporized fuel processing apparatus in a fourth example.

A fourth example will be described in reference to FIG. 8. In the fourth example, the purge passage 15 divides into a pair of passages at a position downstream of the purge valve 12. One of the passages includes the bypass passage 14 and the first passage 15a and is connected to the intake passage 30 downstream of the throttle valve 23. The other of the passages includes the second passage 15b connected to the intake passage 30 upstream of the compressor of the turbocharger 22 and is provided with the purge pump 13. Thus, all of the gas discharged from the purge pump 13 flows into the intake passage 30 upstream of the compressor of the turbocharger 22 via the second passage 15b. On the other hand, the gas passing through the bypass path 14 is supplied to the intake passage 30 downstream of the throttle valve 23 via the first passage 15a.

In the first example, the first passage 15a, the second passage 15b and the bypass passage 14 are provided with the check valves 17, 18 and 19, respectively. By contrast, in the fourth example, because the bypass passage 14 is directly connected to the first passage 15a, the check valve 17 is provided on the first passage 15a and the check valve 19 is omitted. In addition, the check valve 18 is also omitted because the gas does not flow backward through the second passage 15b toward the purge pump 13 and the purge pump 13 is composed of a variable displacement pump preventing the gas from flowing therethrough from its outlet toward its inlet. According to the fourth example, the number of the check valves can be decreased, thereby resulting in a simplified structure.

Figure 9:
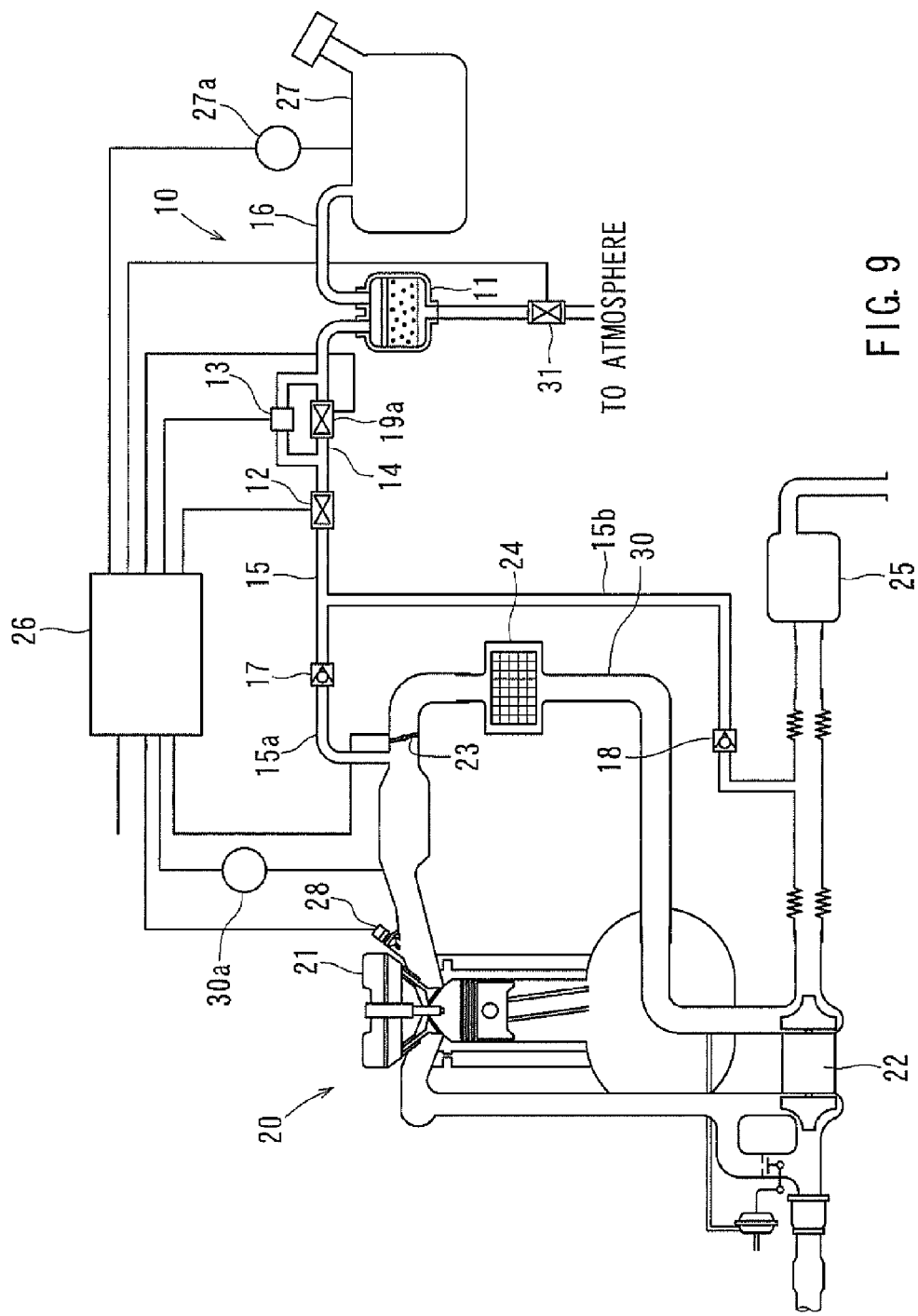
FIG. 9 is a schematic view of the vaporized fuel processing apparatus in a fifth example, where an evaporator on-board diagnostics (OBD) system can be performed during running of an internal combustion engine.

A fifth example will be described in reference to FIG. 9. In the fifth example, the purge valve 12 is positioned downstream of the purge valve 13 and the bypass passage 14. In addition, a solenoid valve 19a is disposed on the bypass passage 14 instead of the check valve 19. Although the position of the purge valve 12 is changed with respect to a parallel section including the purge pump 13 and the bypass passage 14, the purge valve 12 and the parallel section are arranged in series so as to keep the essential function of the vaporized fuel processing apparatus 10. The control unit 26 controls the solenoid valve 19a such that the solenoid valve 19a is closed when the purge pump 13 is operating and is opened when the purge pump 13 is not operating so as to cause the solenoid valve 19a to play the same role as the check valve 19.

According to the fifth example, the parallel section including the purge pump 13 and the bypass passage 14 is positioned between the canister 11 and the purge valve 12, so that the evaporator onboard diagnostics (OBD) system can additionally evaluate airtightness of both the purge pump 13 and the solenoid valve 19. The evaporator OBD system is one of self-diagnosis systems capable of detecting various abnormalities in components and systems of a vehicle and can detect leakage trouble within the evaporation system including the canister 11 and the fuel tank 27. Thus, a solenoid valve 31 is disposed at an atmospheric port of the canister 11. In addition, the fuel tank 27 is equipped with a pressure sensor 27a for detecting an inner pressure of the fuel tank 27. The solenoid valve 31 and the pressure sensor 27a are connected to the control unit 26.

Figure 10:
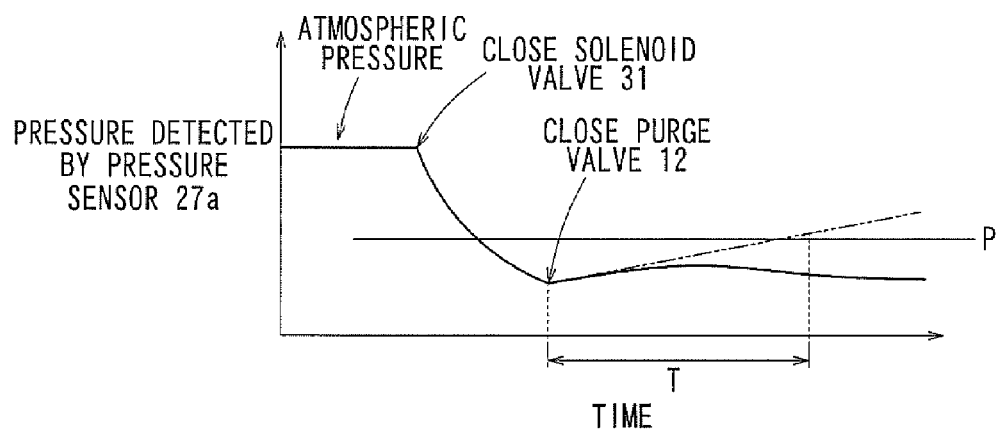
FIG. 10 is a graph showing a relationship between a pressure detected by a pressure sensor 27a and time in the vaporized fuel processing apparatus shown in FIG. 9.

The self-diagnostic function of the evaporator OBD system for the leakage trouble will be described in reference to a time chart shown in FIG. 10. When the solenoid valve 31 is closed in a condition that the purge pump 13 is stopped and both the purge valve 12 and the solenoid valve 19a are opened, the pressure in the evaporation system including the canister 11, the purge passage 15, the vapor passage 16 and the fuel tank 17 becomes negative due to an intake negative pressure of the engine 21. In such a condition, the purge valve 12 is closed so as to block the effect of the intake negative pressure of the engine 21, and then the inner pressure of the fuel tank 27 detected by the pressure sensor 27a is monitored. If the evaporation system has a hole larger than a predetermined diameter (e.g., 0.5 mm), which causes a reduction of the negative pressure, the pressure detected by the pressure sensor 27a would increase above a standard pressure P within a predetermined time T as shown by two-dot chain line in FIG. 10, thereby resulting in detection of the hole larger than the predetermined diameter in the evaporation system. On the other hand, when the pressure detected by the pressure sensor 27a does not exceed the standard pressure P during the predetermined time as shown solid line in FIG. 10, it is determined that there is no hole larger than the predetermined diameter.

According to the fifth example, because the purge pump 13 and the solenoid valve 19a are positioned between the purge valve 12 and the canister 11, it is able to diagnose the airtightness of the evaporation system including the purge pump 13 and the solenoid valve 19a during the leakage trouble diagnosis.

Figure 11:
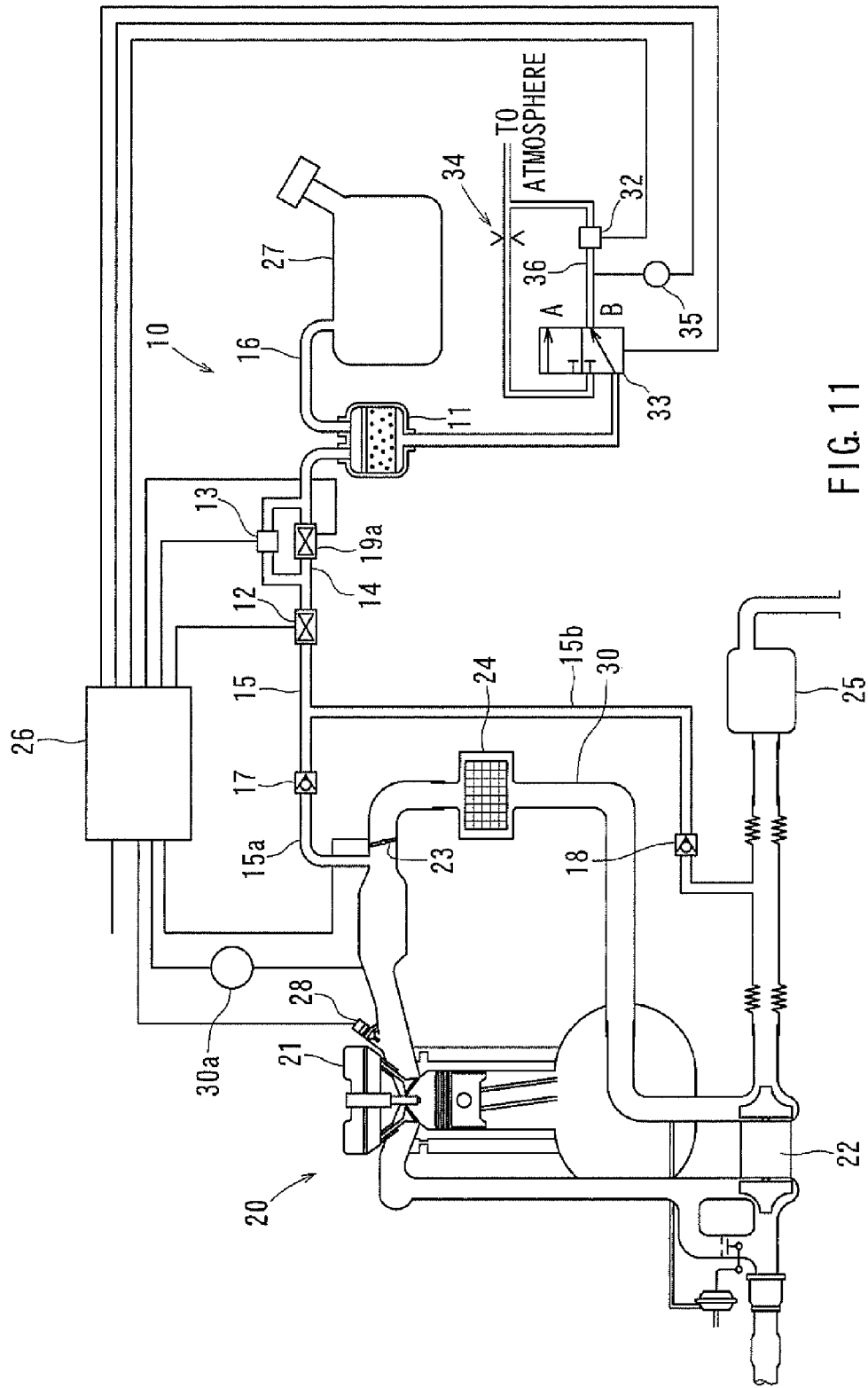
FIG. 11 is a schematic view of the vaporized fuel processing apparatus, where the evaporator OBD system can be performed in a condition that the internal combustion engine is stopped.

A sixth example will be described in reference to FIG. 11. The fifth example is configured to perform the leakage trouble diagnosis by the evaporation OBD system in the operation state of the engine 21 (i.e., when the engine 21 is operating). By contrast, the sixth example is configured to perform the leakage trouble diagnosis in the non-operation state of the engine 21 (i.e., when the engine 21 is not operating). In the sixth example, the atmospheric port of the canister 11 is connected to an electromagnetic switching valve 33 and the like. In detail, the electromagnetic switching valve 33 is configured to selectively switch between a passage A and a passage B. When the electromagnetic switching valve 33 selects the passage A, a pump 32 is communicated with an orifice 34 open to the atmosphere via the passage A. The orifice 34 is set to define therein a flow passage having a predetermined diameter as a standard. When the electromagnetic switching valve 33 selects the passage B, the atmospheric port of the canister 11 is communicated with the pump 32 via the passage B. A passage 36 extending between the pump 32 and the electromagnetic switching valve 33 is provided with a pressure sensor 35 for detecting an inner pressure of the passage 36.

Figure 12:
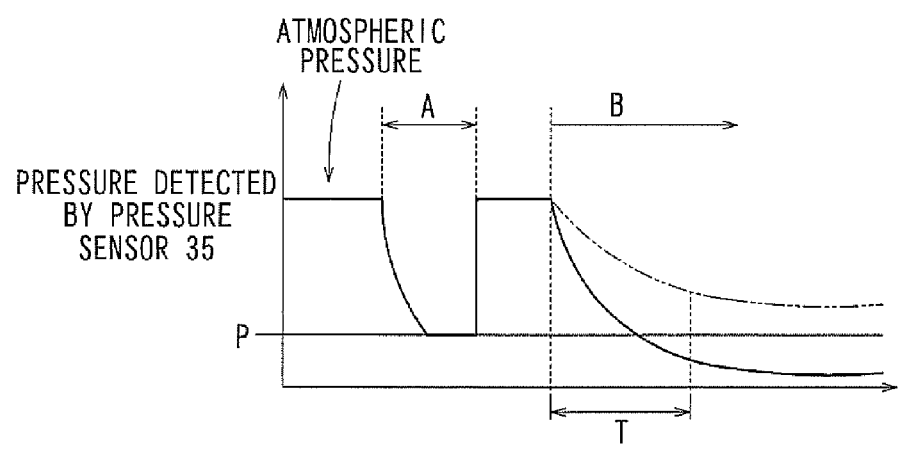
FIG. 12 is a graph showing a relationship between pressure detected by a pressure sensor 35 and time in the vaporized fuel processing apparatus shown in FIG. 11.

The leakage trouble diagnosis by the evaporator OBD system will be described in reference to a time chart shown in FIG. 12. When the pump 32 is driven in the condition that the pump 32 is communicated with the orifice 34 via the passage A in the electromagnetic switching valve 33, the pump 32 sucks the ambient air via the orifice 34. Thus, the pressure in the passage 36 at an inlet side of the pump 32, which is detected by the pressure sensor 35, decreases to a predetermined negative pressure during such condition as shown by "A" in FIG. 12. The control unit 26 stores this minimum pressure as a standard pressure P. Then, the pump 32 is stopped such that the pressure detected by the pressure sensor 35 returns to the atmospheric pressure. Next, in a condition that the purge valve 12 is closed and the solenoid valve 19a is opened, when the operating the pump 32 is started and the electromagnetic switching valve 33 is switched to connect the passage B to the pump 32, the pressure in the evaporation system between the purge valve 12 and the fuel tank 27 becomes negative due to action of the pump 32 during such condition as shown by "B" in FIG. 12. During this operation, if the evaporation system has at least one hole having the total opening area larger than the predetermined value, which corresponds to an opening area of the orifice 34, such that the ambient air flows into the evaporation system through the hole, the pressure detected by the pressure sensor 35 does not reach the standard pressure P during a predetermined time T as shown by two-dot chain line in FIG. 12, thereby determining that the evaporation system has at least one hole having the total opening area larger than the opening area of the orifice 34.

On the other hand, the pressure detected by the pressure sensor 35 decreases below the standard pressure P during the predetermined time T as shown by solid line in FIG. 12, it is determined that the evaporation system does not have at least one hole having the total opening area larger than the opening area of the orifice 34. As described above, the self-diagnosis of the airtightness of the evaporation system including the purge pump 13 and the solenoid valve 19a is performed.

This disclosure can be modified without departing from the scope of the invention. For example, the supercharging device can be composed of a mechanical supercharger instead of the turbocharger 22 used in the described examples. The purge pump 13 can be composed of a turbo pump or other type pump instead of the variable displacement pump. The vaporized fuel processing apparatus of this disclosure can be applied to various engine systems other than the engine system for the vehicle. The vaporized fuel processing apparatus can be applied to an engine system for a hybrid automobile having both an engine and a motor.

The invention claimed is:

1. A vaporized fuel processing apparatus for an engine including an intake passage equipped with a supercharging device and a throttle valve, the vaporized fuel processing apparatus comprising:
   an adsorbent canister adapted to communicate with a fuel tank; and
   a purge passage communicating the adsorbent canister with the intake passage of the engine, the purge passage having, in series:
      a purge valve for controlling communication through the purge passage; and
      a purge pump for generating gas flow from the adsorbent canister toward the intake passage;
   wherein the purge passage includes a sub-passage for communicating the adsorbent canister with the intake passage without passing through the purge pump;
   wherein the purge passage divides into a first passage connected to the intake passage downstream of the throttle valve and a second passage connected to the intake passage upstream of the supercharging device;
   wherein the sub-passage is connected to both an inlet side and an outlet side of the purge pump such that the sub-passage bypasses the purge pump;
   wherein the sub-passage has a valve configured to prevent gas flow through the sub-passage from the outlet side of the purge pump toward the inlet side of the purge pump;
   wherein the purge passage divides into the first passage and the second passage between the purge pump and the intake passage; and
   wherein each of the first passage and the second passage has a valve configured to prevent gas flow from the intake passage toward the adsorbent canister.

2. A vaporized fuel processing apparatus for an engine including an intake passage equipped with a supercharging device and a throttle valve, the vaporized fuel processing apparatus comprising:
   an adsorbent canister adapted to communicate with a fuel tank; and
   a purge passage communicating the adsorbent canister with the intake passage of the engine, the purge passage having, in series:
      a purge valve for controlling communication through the purge passage; and
      a purge pump for generating gas flow from the adsorbent canister toward the intake passage, wherein the purge pump is a variable displacement pump;
   wherein the purge passage includes a sub-passage for communicating the adsorbent canister with the intake passage without passing through the purge pump;
   wherein the purge passage divides into a first passage connected to the intake passage downstream of the throttle valve and a second passage connected to the intake passage upstream of the supercharging device.

3. A vaporized fuel processing apparatus for an engine including an intake passage equipped with a supercharging device and a throttle valve, the vaporized fuel processing apparatus comprising:
   an adsorbent canister adapted to communicate with a fuel tank;
   a purge passage communicating the adsorbent canister with the intake passage of the engine, the purge passage having, in series:
      a purge valve for controlling communication through the purge passage; and
      a purge pump for generating gas flow from the adsorbent canister toward the intake passage;
   a pressure sensor adapted to detect a pressure in the intake passage downstream of the throttle valve; and
   a control unit connected to both the pressure sensor and the purge pump, wherein the control unit is configured to operate the purge pump when the pressure detected by the pressure sensor is above a predetermined value;
   wherein the purge passage includes a sub-passage for communicating the adsorbent canister with the intake passage without passing through the purge pump; and
   wherein the purge passage divides into a first passage connected to the intake passage downstream of the throttle valve and a second passage connected to the intake passage upstream of the supercharging device.

4. A vaporized fuel processing apparatus for an engine including an intake passage equipped with a supercharging device and a throttle valve, the vaporized fuel processing apparatus comprising:
   an adsorbent canister adapted to communicate with a fuel tank; and
   a purge passage communicating the adsorbent canister with the intake passage of the engine, the purge passage having, in series:
      a purge valve for controlling communication through the purge passage; and
      a purge pump for generating gas flow from the adsorbent canister toward the intake passage, wherein the purge passage includes a sub-passage for communicating the adsorbent canister with the intake passage without passing through the purge pump and wherein the purge passage divides into a first passage connected to the intake passage downstream of the throttle valve and a second passage connected to the intake passage upstream of the supercharging device;
   a pressure sensor adapted to detect a pressure in the intake passage downstream of the throttle valve; and
   a control unit connected to both the pressure sensor and the purge pump;
   wherein the control unit is configured to:
      calculate a current purge amount based on the pressure detected by the pressure sensor;
      calculate a target purge amount; and
      operate the purge pump when the current purge amount is less than the target purge amount.

5. A vaporized fuel processing apparatus for an engine including an intake passage equipped with a supercharging device and a throttle valve, the vaporized fuel processing apparatus comprising:
- an adsorbent canister adapted to communicate with a fuel tank; and
- a purge passage communicating the adsorbent canister with the intake passage of the engine, the purge passage having, in series:
  - a purge valve for controlling communication through the purge passage; and
  - a purge pump for generating gas flow from the adsorbent canister toward the intake passage, wherein the purge passage includes a sub-passage for communicating the adsorbent canister with the intake passage without passing through the purge pump and wherein the purge passage divides into a first passage connected to the intake passage downstream of the throttle valve and a second passage connected to the intake passage upstream of the supercharging device;
- a flow sensor adapted to detect a flow rate of gas flowing into the engine; and
- a control unit connected to both the flow sensor and the purge pump;
- wherein the control unit is configured to control the purge pump based on the flow rate detected by the flow sensor.

* * * * *